United States Patent
Mullee

(10) Patent No.: US 7,329,354 B2
(45) Date of Patent: Feb. 12, 2008

(54) PURIFICATION OF ORGANIC SOLVENT FLUIDS

(75) Inventor: William H. Mullee, Portland, OR (US)

(73) Assignee: PPT Technologies, LLC, Portland, OR (US)

( * ) Notice: Subject to any disclaimer, the term of this patent is extended or adjusted under 35 U.S.C. 154(b) by 1099 days.

(21) Appl. No.: 10/231,547

(22) Filed: Aug. 29, 2002

(65) Prior Publication Data

US 2003/0024883 A1    Feb. 6, 2003

Related U.S. Application Data

(63) Continuation-in-part of application No. 09/327,975, filed on Jun. 8, 1999, now Pat. No. 6,660,875.

(60) Provisional application No. 60/315,918, filed on Aug. 29, 2001, provisional application No. 60/088,579, filed on Jun. 9, 1998.

(51) Int. Cl.
    *B01D 15/04* (2006.01)

(52) U.S. Cl. ............... 210/660; 210/661; 210/681; 210/195.1; 210/257.1; 210/258

(58) Field of Classification Search ......... 210/661, 210/660, 685, 688, 195.1, 252, 253, 257.1, 210/258
    See application file for complete search history.

(56) References Cited

U.S. PATENT DOCUMENTS

| 3,568,833 | A | * | 3/1971 | Ritzen .................... 210/661 |
| 4,136,021 | A |   | 1/1979 | Whitehurst ............... 208/251 |
| 4,176,056 | A | * | 11/1979 | Grier ..................... 210/661 |
| 4,769,474 | A |   | 9/1988 | Miyahara et al. .......... 548/497 |
| 4,795,565 | A | * | 1/1989 | Yan ....................... 210/669 |
| 4,970,344 | A | * | 11/1990 | Keller .................... 564/497 |
| 5,006,258 | A | * | 4/1991 | Veatch et al. ............. 210/677 |
| 5,055,201 | A |   | 10/1991 | Wegner ................... 210/727 |
| 5,162,084 | A | * | 11/1992 | Cummings et al. ........ 210/662 |
| 5,234,789 | A |   | 8/1993 | Favier, Jr. et al. ........ 430/165 |
| 5,245,029 | A |   | 9/1993 | Inaba et al. ............. 540/540 |
| 5,350,714 | A | * | 9/1994 | Trefonas et al. ........... 438/780 |
| 5,500,127 | A | * | 3/1996 | Carey et al. ............. 210/685 |

(Continued)

FOREIGN PATENT DOCUMENTS

GB    2088850    12/1980

(Continued)

OTHER PUBLICATIONS

Buragohain, Partha V. et al., "Novel Resin-Based Ultrapurification System for Reprocessing IPA in the Semiconductor Industry," Ind. Eng. Chem. Res. 35, 3149-3154, 1996.

(Continued)

*Primary Examiner*—Duane Smith
*Assistant Examiner*—Robert A Clemente
(74) *Attorney, Agent, or Firm*—Stoel Rives LLP

(57) ABSTRACT

A chemical distribution system having improved organic solvent fluid purity and consistency includes a vessel containing ion-exchange media positioned within a fluid flow pathway such that the organic solvent fluid passes through the ion-exchange media, thereby effecting removal of undesired impurities. Different embodiments of the invention position the vessel at varying locations within the fluid flow pathway. The chemical distribution system also preferably includes a return chemical flow pathway that recirculates purified organic solvent fluid through the ion-exchange media-containing vessel and thereby enables the system operator to conduct incremental adjustment of the solvent purity until a desired overall purity is attained.

54 Claims, 9 Drawing Sheets

U.S. PATENT DOCUMENTS

| | | | | |
|---|---|---|---|---|
| 5,518,628 A | * | 5/1996 | Carey | 210/686 |
| 5,674,662 A | * | 10/1997 | Szmanda et al. | 430/270.1 |
| 5,702,611 A | | 12/1997 | Gronbeck et al. | 210/686 |
| 5,788,946 A | * | 8/1998 | Riddle et al. | 423/387 |
| 5,902,893 A | | 5/1999 | Laxman | 556/466 |
| 5,990,356 A | | 11/1999 | Commarieu et al. | 568/37 |
| 6,054,109 A | | 4/2000 | Saito et al. | 423/584 |
| 6,123,850 A | * | 9/2000 | Commarieu et al. | 210/662 |
| 6,660,875 B1 | | 12/2003 | Mullee | 556/466 |

FOREIGN PATENT DOCUMENTS

| | | |
|---|---|---|
| JP | 4065415 | 3/1992 |
| JP | 5148306 | 6/1993 |
| JP | 5148309 | 6/1993 |
| RU | 2032655 | 4/1995 |

OTHER PUBLICATIONS

Myakon'kii, A.G., et al., "Purification of Alcohols With Respect to Electron Conductive Impurities by Ion Exchange," *Vysokchistye Veschestra*, vol. 2 (1992), pp. 71-75.

Elliot, *Integrated Circuit Fabrication Technology*, McGraw-Hill Book Company, 312-313, 1982.

C.A. Fleming and A.J. Monhemius, "On the Extraction of Various Base Metal Chlorides from Polar Organic Solvents into Cation and Anion Exchange Resins," Hydrometallurgy, 4, pp. 159-167 (1979).

Samuelson, *Ion Exchange Separations in Analytical Chemistry*, ch.2, John Wiley & Sons, 1963.

Dennis Capitanio, Yoshiki Mizuno, and Joseph Leeca, *Metal ion removal from photoresist solvents*, presented at the Microlithography Conference on Mar. 15, 1999.

R.T. Talasek, *Trends in Liquid Chemicals for Semiconductor Processing*, Semiconductor International, Jul. 1999, available on-line at http://www.fabtech.org/features/genchem/index.shtml.

Pall Product Brochure for IonKleen™—SL Purifier, 2002, available on-line at http://domino.pall.com/www/si%20catalog.nsf/4b0ade521184ef90852567ad00409ae1/1c769e8d14114c4e85256bbc0056eb9f?OpenDocument.

Written Opinion concerning corresponding International Application No. PCT/US2002/27828, Jul. 7, 2003.

* cited by examiner

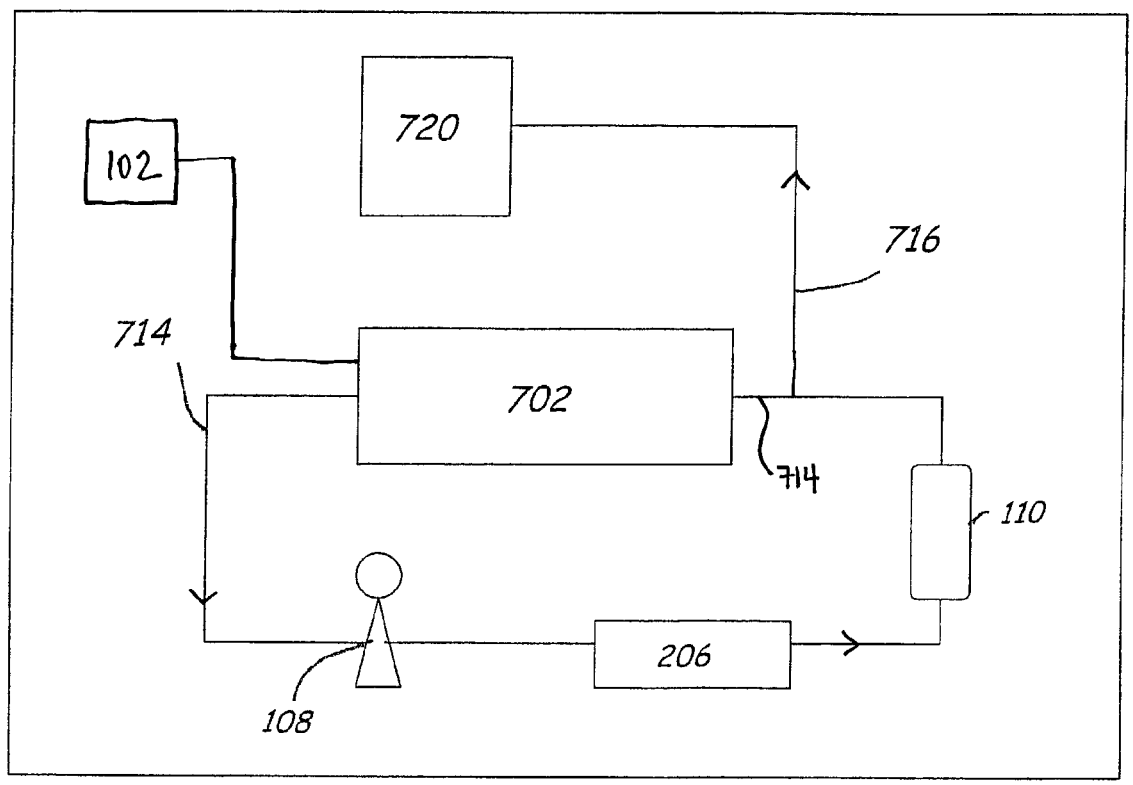

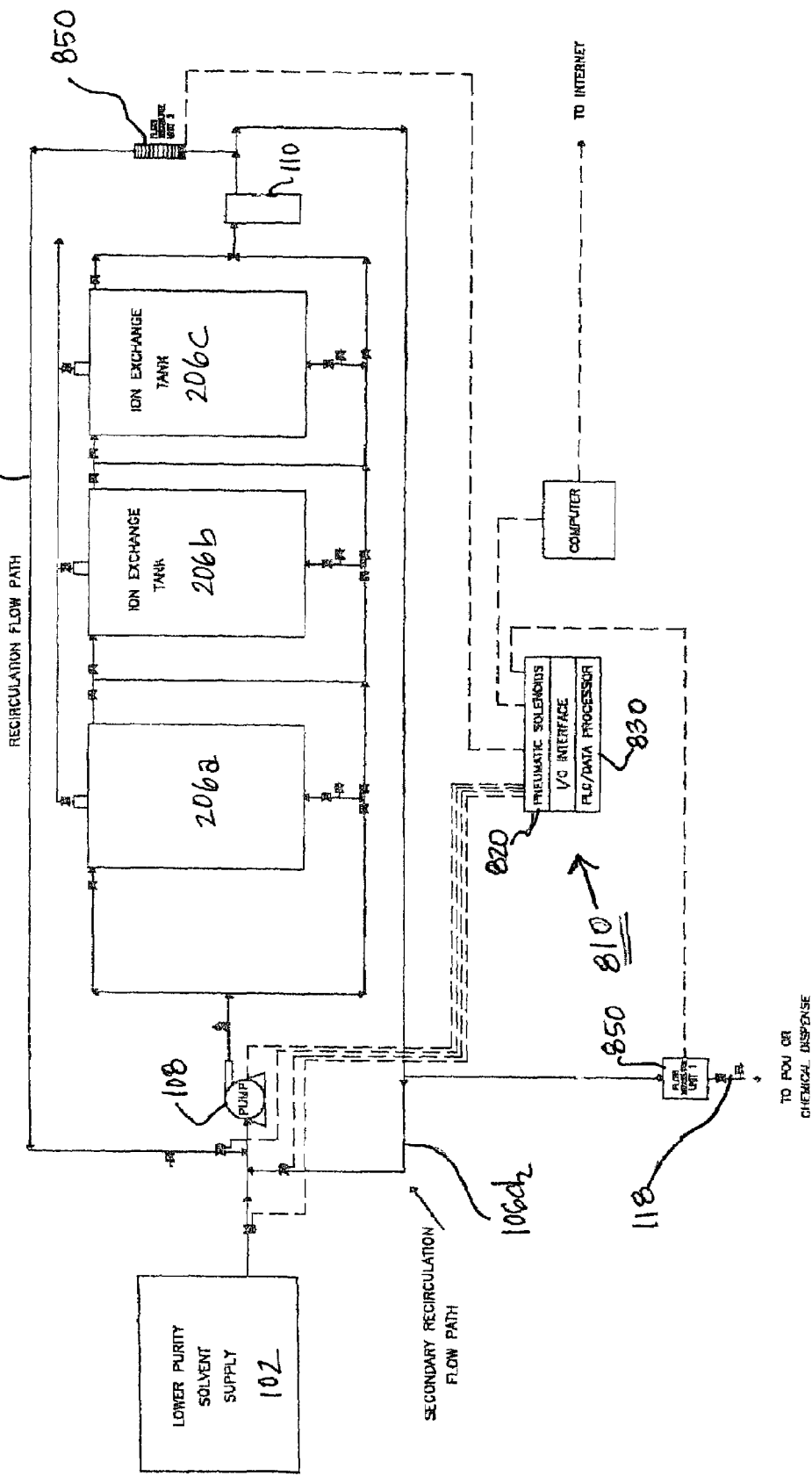

PURIFICATION OF ORGANIC SOLVENT FLUIDS

RELATED APPLICATIONS

This application is a continuation-in-part of U.S. patent application Ser. No. 09/327,975, filed Jun. 8, 1999, which claims priority from U.S. Provisional Patent Application No. 60/088,579, filed Jun. 9, 1998, and claims priority from U.S. Provisional Patent Application No. 60/315,918, filed Aug. 29, 2001.

COPYRIGHT NOTICE

© 2002 PPT Technologies, LLC. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

TECHNICAL FIELD

The present invention relates generally to the purification of organic solvent fluids and particularly to the purification of organic solvent fluids associated with a chemical purification system.

BACKGROUND OF THE INVENTION

Many industries, most notably the semiconductor, microelectronics, optoelectronics, microelectro-mechanical systems, nanotechnology, pharmaceutical, radio pharmaceutical, microlithography, and biotechnology industries, require large amounts of high-purity organic solvent fluids for various drying, cleaning, analytical, and manufacturing processes. For example, in the manufacture of modern integrated circuits, it is known that organic solvent fluids come into direct contact with the device materials. Such fluids include process and treatment chemicals, etchants, strippers and organic solutions containing polymers, esters, acids, and amines. Organic solvent fluids of various compositions are used to clean, develop, rinse, and dry wafers; prime surfaces; remove edge deposits; strip photo resist; and deposit dielectric materials. The lower purity forms of these organic solvent fluids may contain undesirably high amounts of particulate matter and various other impurities including water, trace metals, and other ions, all of which can negatively impact circuit performance. For example, the presence of excess chloride ions may cause corrosion to form on metal features of the circuit, resulting in circuit failure. Also, the presence of excess metal ions in some dielectric materials can negatively affect the voltage stability and drift in semiconductor devices.

The majority of commercially available organic solvent fluids used in the semiconductor industry have a high purity level, with a contamination level ranging from about 1 to about 100 parts per million (ppm). While this level of purity is acceptable for most industries, it is unacceptable for the above-identified industries, which require organic solvent fluids having trace metal element or ionic impurity levels of less than one part per billion (ppb). Because commercially available organic solvent fluids contain excess suspended particles, ionic impurities, and trace metals, they may be subjected to an additional purification procedure before use.

Various purification procedures for removing dissolved cationic and anionic impurities from organic fluids exist. One such purification procedure involves using ion-exchange materials to remove alkaline metal salts from an aqueous alkanolamine solution, as described in U.S. Pat. No. 4,795,565. Specifically, certain salts present in refinery gases and produced during the ethanolamine extraction of carbon dioxide and hydrogen sulphide are selectively removed. The spent ethanolamine solution, containing between about 50 weight percent and about 80 weight percent water, is passed over various stationary beds of strong anionic and cationic resins.

Another purification procedure involves using ion-exchange materials to remove alkaline metal salts from an alkanolamine solution used in industrial gas treatment systems, as described in U.S. Pat. No. 5,162,084.

Another purification procedure involves selectively extracting certain aromatic hydrocarbons present in a mixture of paraffins. As described in British Patent No. 2,088,850, an anionic ion-exchange media can be used to remove acidic and/or chloride corrosive impurities from aqueous 1-methyl-2-pyrrolidone (NMP). More specifically, aromatic hydrocarbons from a mixed hydrocarbon source can be removed by directing a recycled NMP-water stream through an ion-exchange media.

Another purification procedure, described in Russian Patent No. 2,032,655 of Magomedbekob et al., involves the deionization of aliphatic alcohol and diols using water-saturated stationary beds of anionic and cationic resins, thereby reducing the electrical conductivity of the organic solvents.

Another purification procedure, described in the Buragohain et al. article entitled "Novel Resin-Based Ultra Purification System for Reprocessing IPA in the Semi-conductor Industry," involves using cation ion-exchange materials in combination with a molecular sieve and activated carbon materials to recycle an aqueous 2-propanol solution of semiconductor manufacturing waste.

Another purification procedure involves using a sulphonic ion-exchange media having acidic $SO_3H$ active groups to purify dimethyl sulphoxide, as discussed in U.S. Pat. No. 5,990,356.

Because there are various opportunities for the purified organic solvent fluid to be contaminated, a second concern is in-system contamination. For example, once the high purity organic solvent fluid is available for use, it is typically placed into an empty canister, drum, tanker, or other container, which may contain contaminants. These containers are subsequently transported to the device fabrication facility and placed into the existing chemical distribution system, where their contents may have a different purity level than the contents of the existing chemical distribution system. Thus, if the incoming containers of organic solvent fluid having one concentration of impurities are added to existing amounts of organic solvent fluids having a different concentration of impurities, the resultant chemical purity levels within the entire chemical distribution system and/or at the end-use point of connection may be adversely affected. Also, the organic solvent fluid may be contaminated as a result of use and exposure to contaminated equipment or to the articles of manufacture. Further, semiconductor wafers and flat panel displays are often processed using repeated immersion cycles in which the wafers or displays are dipped into and out of multiple baths for cleaning purposes, resulting in contamination of the liquid in the baths. As a result, the high purity organic solvent fluids may be further contaminated by the manufacturing equipment and the existing liquids therein.

Maintaining a consistent process chemical purity level is especially important in the semiconductor and electronics manufacturing industries, because any variation in impurity concentration can adversely impact the stability of the manufacturing system and significantly reduce the quality of the final product. Consequently, stringent quality-control procedures are typically utilized to maximize chemical consistency and minimize the impact of these purity fluctuations.

In an effort to maintain high purity organic solvent fluids within their point-of-use chemical systems, many manufacturers replace all of the organic solvent fluids contained therein. However, this process is very expensive because it necessitates replacing the expensive high purity organic solvent fluids and because the manufacturer has to dispose of the resultant hazardous waste. A method of increasing the purity of the organic solvent fluids within the chemical distribution system is to replace the particle filters. However, this is also very expensive because each of the pleated TEFLON™ filters, for example, costs between about $500 and about $5,000. Further, the replacement process may require shutting down the entire system.

Therefore, it is desirable to have available a cost-efficient method of and system for purifying organic solvent fluids that become contaminated during manufacture, use, shipment, or handling. The purification method preferably increases the purity of the organic solvent fluids such that the purified organic solvent fluids have trace metal element or ionic impurity levels of less than one ppb and more preferably of less than 0.1 ppb.

Further, it is desirable to have available a cost-efficient method of and system for increasing both the purity and the consistency of the commercially available organic solvent fluids within the purification system such that over time the amount of impurities found in the organic solvent fluids remains stable.

SUMMARY OF THE INVENTION

An object of the present invention is, therefore, to provide a cost-efficient method of and system for purifying and maintaining the purity of organic solvent fluids that are contained within a chemical purification system and that become contaminated during manufacture, use, shipment, or handling.

The present invention achieves improved organic solvent fluid purity and consistency by placing a vessel containing ion-exchange media within the fluid flow pathway of a chemical purification system. Operation of the purification distribution system entails passing a lower purity organic solvent fluid through the vessel containing ion-exchange media having electrically charged species that ionically interact with the metallic and ionic impurities in the organic solvent fluid, thereby effecting removal of undesired impurities from the organic solvent fluid. Different embodiments of the present invention position the vessel at varying locations within the fluid flow pathway of a chemical distribution system or of a stand-alone chemical purification system. Exemplary preferred embodiments position the vessel within or adjacent to the solvent supply source, within or adjacent to a chemical distribution module, within or adjacent to a temporary storage tank, and within or adjacent to the fluid outlet. The present invention is particularly useful in chemical distribution or stand-alone purification systems in which the purity and/or consistency of the incoming organic solvent fluid is less than desired.

The chemical distribution or purification system of the present invention preferably includes a return chemical flow pathway that recirculates the purified organic solvent fluid through the vessel containing ion-exchange media. The degree of purification may thus be adjusted by varying the number of passes the organic solvent fluid makes through the vessel. Because the purity level increases with increased ion-exchange media contact and because controlling the number of passes the organic solvent fluid makes through the ion-exchange media enables incremental adjustment of the concentration of impurities to achieve a desired overall purity, the system operator may accurately produce organic solvent fluid having a desired purity.

The chemical distribution or chemical purification systems of the present invention have the further advantage of allowing the operator to maintain a constant flow of organic solvent fluid within the system and to thereby reduce the incidence of changes in flow rate that cause impurities to dislodge from the system equipment. Similarly, the chemical distribution or chemical purification systems of the present invention facilitate the controlled purification of organic solvent fluids by mixing purified organic solvent fluid with lower purity organic solvent fluid at various ratios to change the efficiency of the system. For example, by increasing the flow rate while maintaining a constant feedstock flow rate, the overall efficiency of the systems may be increased.

Additional objects and advantages of this invention will be apparent from the following detailed description of preferred embodiments thereof, which proceeds with reference to the accompanying drawings.

BRIEF DESCRIPTION OF THE DRAWINGS

FIG. 7 is a reduced-scale schematic process flow diagram of a chemical distribution system in accordance with the fourth preferred embodiment of the present invention.

FIG. 8 is a schematic flow diagram of a stand-alone purification system in accordance with the sixth embodiment of the present invention.

DETAILED DESCRIPTION OF PREFERRED EMBODIMENTS

Figure 1A:
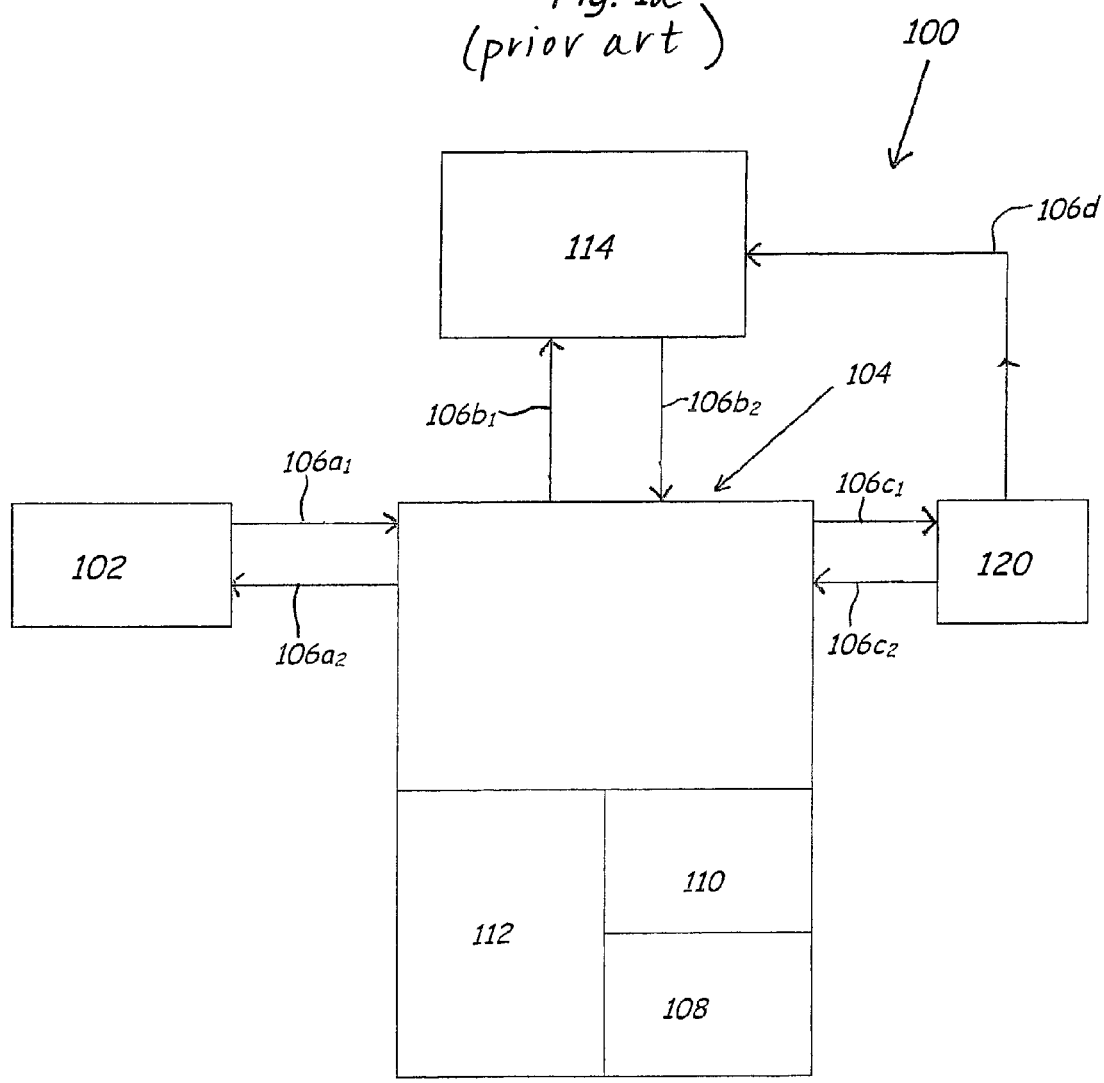
FIGS. 1a and 1b are reduced-scale schematic process flow diagrams respectively showing a prior art chemical distribution system and a prior art stand-alone purification system.

As shown in FIG. 1a, a prior art chemical distribution system 100 includes an organic solvent supply source 102 that contains an organic solvent fluid and that is connected to a CDM 104 by a first portion 106$a_1$ of a piping network 106 that forms a fluid flow pathway. A CDM pump 108 comprising one or more mechanical or pneumatic devices or a combination thereof is positioned within CDM 104 to supply a motive force that draws the organic solvent fluid from organic solvent supply source 102, through a particle filter 110, and either into an internal temporary storage tank 112 or through a second portion 106$b_1$ of piping network 106 into an external temporary storage tank 114. Where the system includes internal temporary storage tank 112, pressurization of tank 112 by any known means, including mechanical or pneumatic, may provide the motivating force for organic solvent fluid transfer through particle filter 110 and subsequent fluid flow pathways. Alternatively, the organic solvent fluid can flow directly through a third portion 106$c_1$ of piping network 106 that acts as a fluid outlet and is connected to an end-use point of connection 120. Additionally, piping network 106 may be extended to include return chemical flow pathway piping 106$d$, which conveys unused organic solvent fluid back to external temporary storage tank 114 or internal temporary storage tank 112. Each portion of piping network 106$a$, 106$b$, and 106$c$ includes two separate pathways, one of which carries the organic solvent fluid in a downstream direction and one of which carries the organic solvent fluid in an upstream direction, as denoted by the respective subscripts "1" and "2."

Figure 1B:
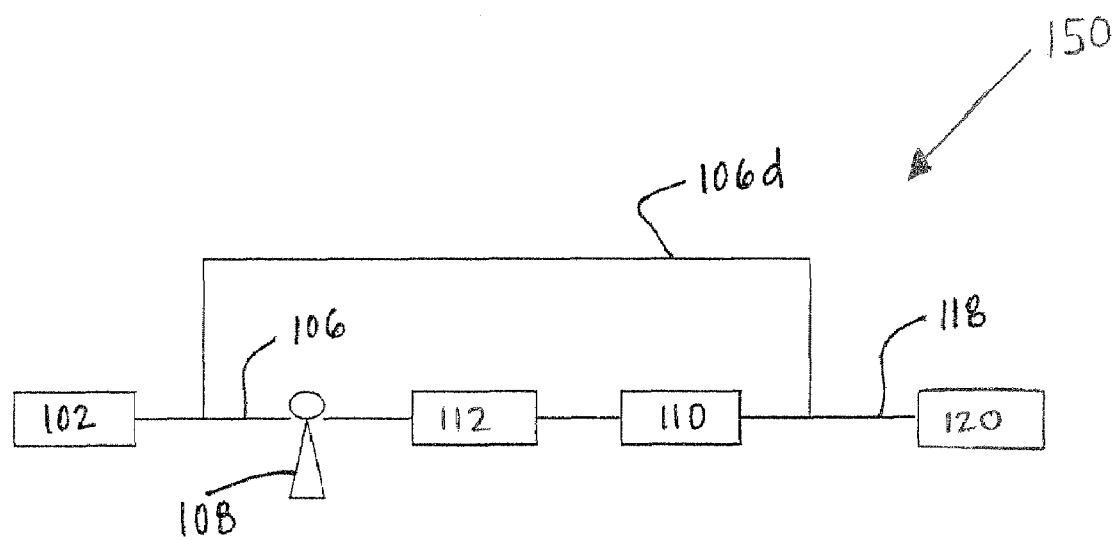

As shown in FIG. 1$b$, a prior art stand-alone chemical purification system 150 includes an organic solvent supply source 102 that contains an organic solvent fluid and that is connected to a pump 108 that supplies a motivating force that pumps the organic solvent fluid from solvent supply source 102 through a piping network 106 into particle filter 110. The filtered organic solvent fluid then passes through a fluid outlet 118 and flows into an end-use vessel 120. Chemical purification system 150 further includes return chemical flow pathway 106$d$.

Different embodiments of the present invention, described by way of example, position a vessel containing ion-exchange media within the fluid flow pathway of chemical distribution system 100 of FIG. 1$a$ and chemical purification system of FIG. 1$b$ such that the organic solvent fluid flowing through the fluid flow pathway passes through the ion-exchange media, thereby effecting removal of undesired impurities from the organic solvent fluid. Although the vessel can be positioned anywhere along the fluid flow pathway, the vessel is preferably positioned at a location where the organic solvent fluid is supplied, dispensed for use, stored, or transported. A chemical distribution of the present invention can include a chemical purification system of the present invention, as described in greater detail below.

Different embodiments of the present invention, described by way of example, also include a return chemical flow pathway within the fluid flow pathway of chemical distribution system 100 of FIG. 1$a$ and chemical purification system of FIG. 1$b$ such that the purified organic solvent fluid flowing through the fluid flow pathway may be recirculated such that it undergoes multiple passes through the ion-exchange media-containing vessel. Although the return chemical flow pathway can be positioned anywhere within the fluid flow pathway, it is preferably positioned in a location that facilitates the incremental adjustment of the impurity concentration of the organic solvent fluid.

Skilled persons will appreciate that the chemical distribution system and the chemical purification system of the present invention can be stand-alone systems or can be positioned within larger existing systems, i.e., a semiconductor device fabrication facility (fab). Skilled persons will also appreciate that the various alternative implementations and embodiments depicted and described below can be altered and combined to form a chemical distribution system or a chemical purification system having multiple vessels containing ion-exchange media positioned within the fluid flow pathway at either a single site or varying sites. Thus, because the vessels may be positioned at any point along the fluid flow pathway, the present invention is not limited to the exemplary embodiments depicted in the figures or described in the specification.

Figure 2:
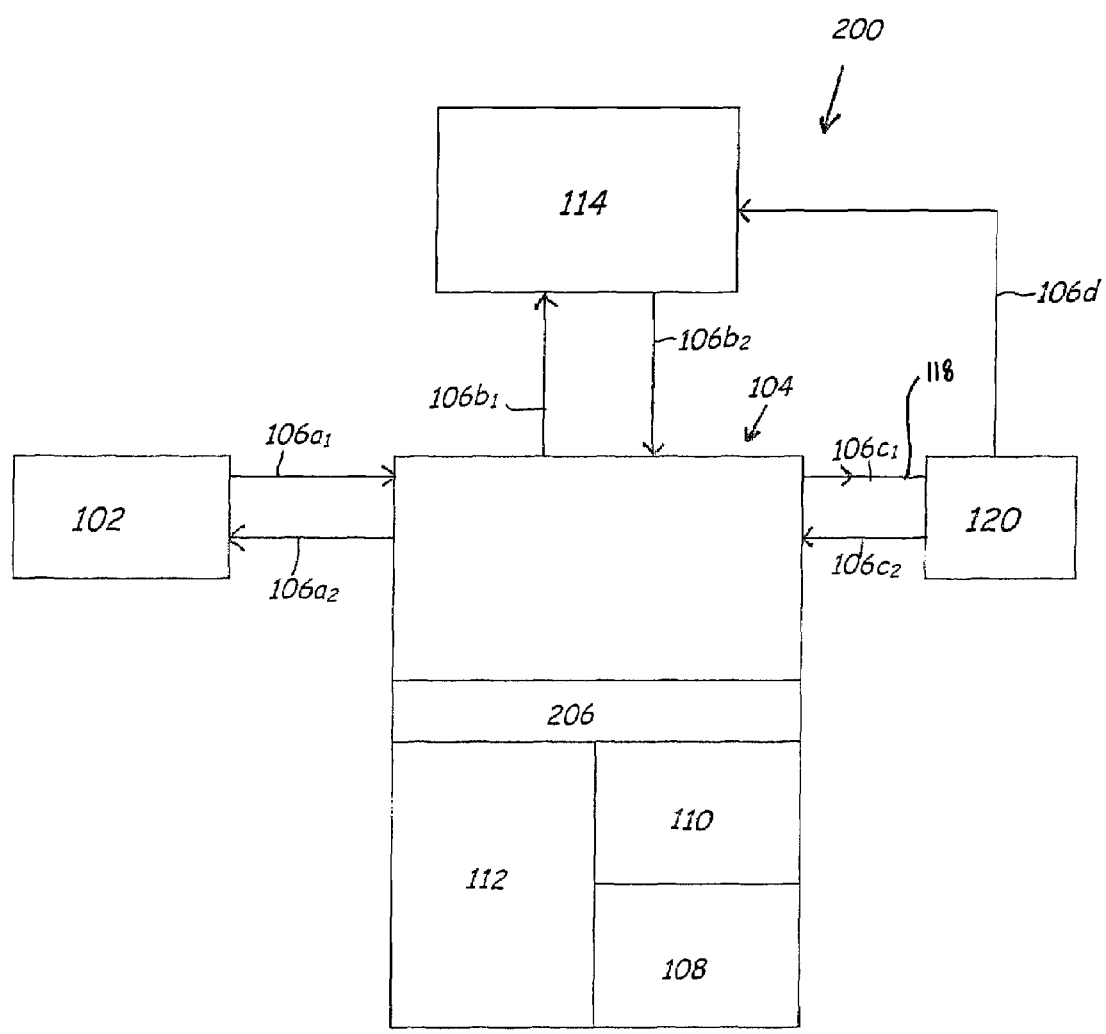
FIG. 2 is a reduced-scale schematic process flow diagram of a chemical distribution system in accordance with the first preferred embodiment of the present invention.

FIG. 2 shows a reduced-scale schematic process flow diagram of a first embodiment chemical distribution system 200 in which a vessel 206 containing ion-exchange media is positioned within CDM 104. Lower purity organic solvent fluid exits solvent supply source 102 and flows through first portion 106$a_1$ of piping network 106 into CDM 104. When not directed to point of use, the organic solvent fluid may be pumped by CDM pump 108 through first portion 106$a_2$ of piping network 106 back into organic solvent supply source 102. CDM pump 108 also functions to pump the organic solvent fluid in CDM 104 through particle filter 110, vessel 206, and a third portion 106$c_1$ of piping network 106 directly into point of use 120. Alternatively, organic solvent fluid may flow through a second portion 106$b_1$ of piping network 106 into external temporary storage tank 114 where it is stored until needed, at which time it flows through a second portion 106$b_2$ of piping network 106 back into CDM 104, where CDM pump 108 pumps the organic solvent fluid through particle filter 110 and vessel 206. The resultant higher purity organic solvent fluid then flows through third portion 106$c_1$ of piping network 106 into point of use 120. Overflow higher purity organic solvent fluid may flow through either third portion 106$c_2$ of piping network 106 into CDM 104 or may flow through return chemical flow pathway 106$d$ into external temporary storage tank 114. These recirculation loops facilitate the generation and maintenance of a higher purity organic solvent fluid by effecting continual circulation through vessel 206 and thus continual purification of the fluid.

While the preferred size of vessel 206 depends on the type of organic solvent fluid to be purified, the anticipated level of impurity therein, the desired system flow rate, and the desired system pressure, a preferred vessel is of a size that minimizes pressure loss while providing optimum ion-exchange media capacity. The vessel preferably contains sufficient ion-exchange media to effect a contaminant removal of greater than 95 percent for up to one year following installation of the vessel.

Particle filter 110 is preferably a conventional TEFLON™ filter containing polytetrafluoroethylene (PTFE) or perfluoro alkoxyalkane (PFA) that removes any remaining contaminants from the otherwise purified organic solvent fluid. Remaining contaminant particulates are typically 0.05 μm or larger.

Organic solvent supply source 102 may be any suitable source including a clean drum, a tote tank container, or a pipeline. Although piping network 106, vessel 206, associated valves and any other fittings, filter housings, sensors, and gauges may be made of any appropriate material, including plastic, they are preferably made of electropolished stainless steel because it is smooth, nonporous, nonreactive, and noncorrosive. Further, electropolished stainless steel systems offer increased safety when using flammable solvents. An exemplary commercially available electropolished stainless steel is 316L SS EP manufactured by Valex Corporation. Alternatives to electropolished stainless steel include other corrosion-resistant alloys capable of achieving a high degree of smoothness. Electropolishing is the preferred surface treatment. The surface finish preferably has a measurable surface finish of less than 20 Ra, as measured by a profilometer. CDM 104 and CDM pump 108 are also preferably made of electropolished stainless steel and more preferably Type 316L electropolished stainless steel. All chemical distribution system piping preferably has welded ends connected by an orbital welding process rather than mechanical fittings, to minimize the occurrence of impurities lodging in the cracks and crevices and then dislodging during system operation, thereby increasing the concentration of impurities in the organic solvent fluid. Further, all wetted components of CDM 104 and CDM pump 108 are particularly selected for smooth surfaces and preferably have very few cracks or crevices. CDM 104 and CDM pump 108 are constructed in a manner such that they are safe to operate in a flammable or combustible material environment.

The chemical purification system of the present invention can be used to purify numerous types of organic solvent fluids or mixtures of fluids. Amphiprotic solvents, such as isopropanol, ethyl lactate, n-butyl acetate, ethylene glycol, cyclopentanone, and mixtures thereof, are one type of exemplary organic solvent fluid. A second type of exemplary organic solvent fluid is polar aprotic solvents, such as acetonitrile, acetone, dimethylformamide, and mixtures thereof. Aromatic compounds, such as benzocyclobutene, polyaryl ethers, and mixtures thereof, are a third type of exemplary organic solvent fluid. A fourth type of exemplary organic solvent fluid is dielectric compounds, such as tetraethylorthosilicate, porous or nonporous organic silicate esters, fluorinated organic silicate esters, perfluorocyclobutenes, hydrogen silsequioxanes, methyl silsequioxane, and mixtures thereof. Edge-bead removal chemicals, for example, ethyl lactate, are a fifth type of exemplary organic solvent fluid. Further, organic solvent fluids for use in the present invention may be mixtures of chemicals within the above-identified types, mixtures of chemicals of differing types, and mixtures of chemicals from types other than those identified above.

It is preferable that the organic solvent fluid be virtually anhydrous, which is here intended to refer to an organic solvent fluid having a water content lower than or equal to 1 percent by weight, preferably lower than or equal to 0.15 percent by weight.

Any type of ion-exchange media that is compatible with the solvent being purified and that is specific to the removal of the contaminating ionic species can be implemented in the system of the present invention. The term "media" refers to any medium by which ion-exchange purification may occur, including, for example, resin and membranes. The term "compatible" means that the ion-exchange media cannot be chemically degraded by the solvent. Ion-exchange media typically includes inert materials such as cross-linked polystyrene, divinylbenzene, or polymethacrylate polymers that are chemically bonded to the charged ions to form a three-dimensional polymer network and thereby prevent dissolution. The positive or negative charge of the ion-exchange media attracts contaminants having the opposite charge. The preferred forms of the ion-exchange media active sites are the acid proton H+ cation, rather than a sodium ion or other cation, and the hydroxyl OH— anion, rather than a chloride ion or other anion.

Although any type of ion-exchange media may be implemented, macroporous ion-exchange medias are preferred because they have numerous crevices on the surface of each resin bead that increase the surface area and thus the number of available ion-exchange sites. Exemplary preferred classes of macroporous resins include strong acid, mixed bed, and strong base resins. Preferred macroporous ion-exchange medias have macropores of about 0.3 to about 1.2 millimeters in diameter and a density of about 40 to about 50 pounds per cubic foot, but skilled persons will appreciate that particular resins can be selected to accommodate the sizes and densities of specific contaminants based on the quality of the organic solvent fluid to be purified and the size of the contaminants. Exemplary commercially available macroporous resins include Sybron Ionac CFP-110 cationic resin, and Sybron Ionac A-641 anionic resin.

Exemplary anionic resin types include divinylbenzene-styrene copolymers, phenolformaldehydes, acrylics, and epoxies. Exemplary cationic exchange resins include sulfonic acids; divinylbenzene-styrene copolymers; acrylics; phenolic cross-linked polystyrenes; phenolic novolaks, including phenol-formaldehyde novolak resins, cresolformaldehyde novolak resins, and polyvinyl phenol resins; carboxylic phosphonics; vinyl pyridine-styrene copolymers; acrylics; or substituted styrenes. Commercially available cationic resins include Amberlyst™ manufactured by Rohm and Haas and Sybron SP-112 manufactured by Bayer. Exemplary mixed-ion resins include Sybron NM-201SG, IRN manufactured by Rohn and Haas, and Dowex Monosphere MR-450 UPW manufactured by Dow Chemical.

It is preferable to dry or otherwise eliminate water from the ion-exchange media. A preferred drying technique involves rinsing the ion-exchange media with a volume of drying agent, such as an evaporative alcohol (e.g., isopropyl alcohol, n-propyl alcohol, or methyl alcohol), that is about 3 to 6 times the volume of the ion-exchange media. The drying process can be performed at room temperature or at an elevated temperature. Drying may occur before or after placement of the ion-exchange media into the vessel. The ion-exchange media-containing vessels are preferably flushed with an organic solvent fluid before purification is initiated.

The chemical distribution or purification systems of the present invention may include a single ion-exchange vessel, multiple ion-exchange vessels, or paired or uneven sets of ion-exchange vessels in series or parallel alignment such that the organic solvent fluid can be purified in a single cycle. In systems having multiple ion-exchange media-containing vessels, each ion-exchange vessel may include a mixed bed of anionic and cationic resins or one of the vessels may include only anionic resins while the other vessel contains only cationic resins. Skilled persons will appreciate that the order of the separately charged ion-exchange media-containing vessels may vary. Further, systems including multiple ion-exchange vessels may contain slightly different ion-exchange media, for example, vessels containing ion-exchange medias having crevices of decreasing sizes or increasing numbers of crevices.

The chemical distribution system or the chemical purification system of the present invention is preferably operated at a temperature ranging from about 0° C. to about 100° C., preferably between about 19° C. and about 80° C., and more preferably between about 20° C. and about 50° C. Purification of the organic solvent fluid may occur in a batch mode to fill individual containers or continuously to supply a constant stream of product. Further, the nominal operating system pressure inside the vessel is preferably between about 1 psig and about 5000 psig.

Figure 3:
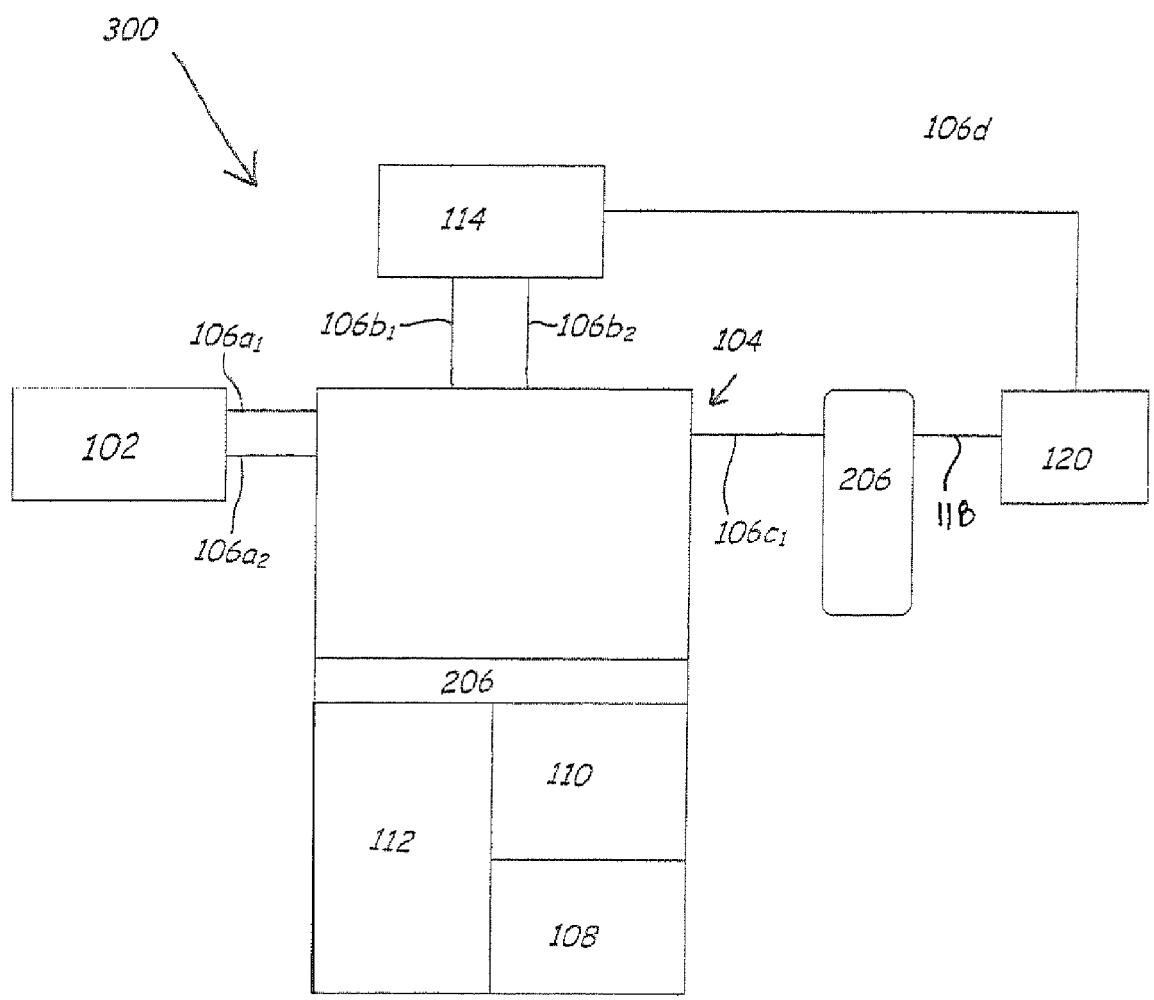
FIGS. 3 and 4 are reduced-scale schematic process flow diagrams of alternative implementations of the first preferred embodiment chemical distribution system shown in FIG. 2.
Figure 4:
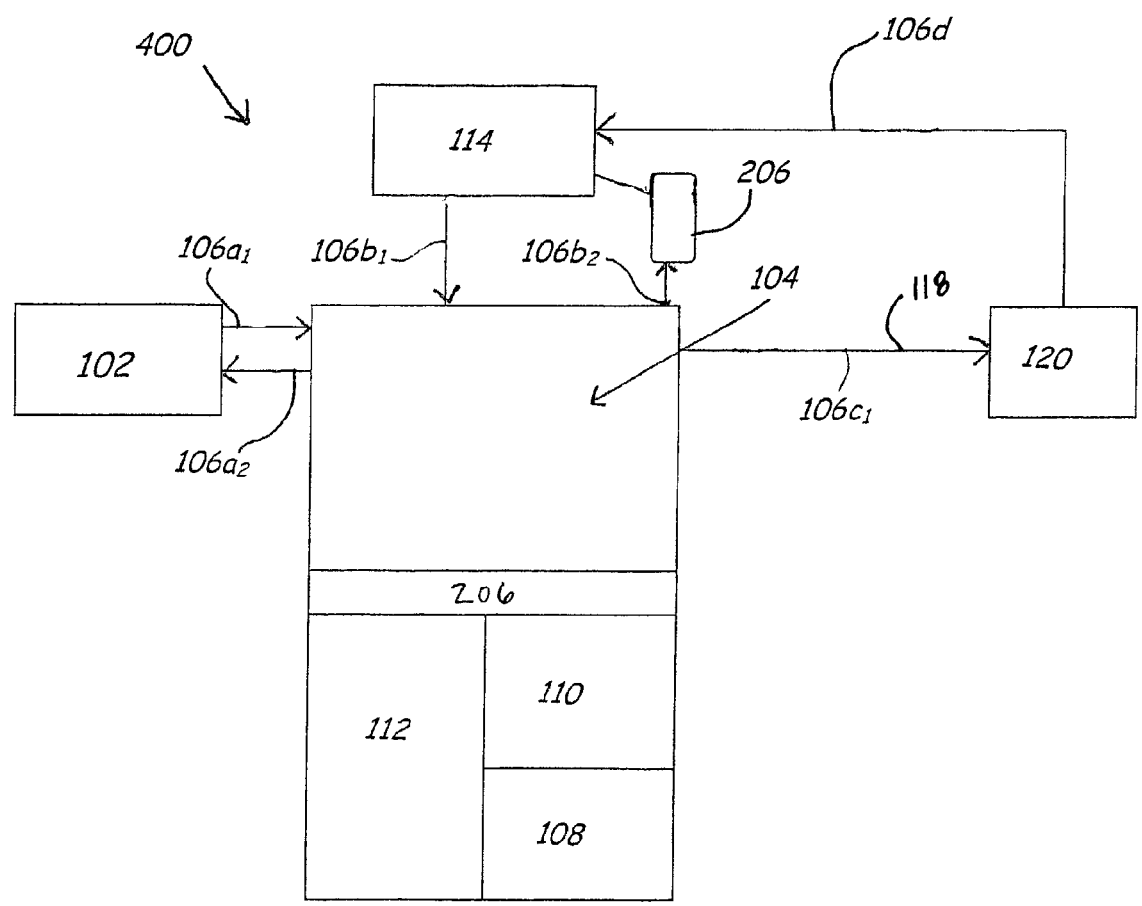

FIGS. 3 and 4 depict two exemplary alternative implementations of the first preferred embodiment of the present invention. FIG. 3 is a reduced-scale schematic process flow diagram of a chemical distribution system 300 in which vessel 206 is positioned between CDM 104 and point of use connection 120 such that the organic solvent fluid passes through the ion-exchange media before transport to point of use connection 120. FIG. 4 is a reduced-scale schematic process flow diagram of a chemical distribution system 400 in which an ion-exchange vessel is positioned between CDM 104 and external temporary storage tank 114 such that the organic solvent fluid is purified before it enters external temporary storage tank 114.

Figure 5:
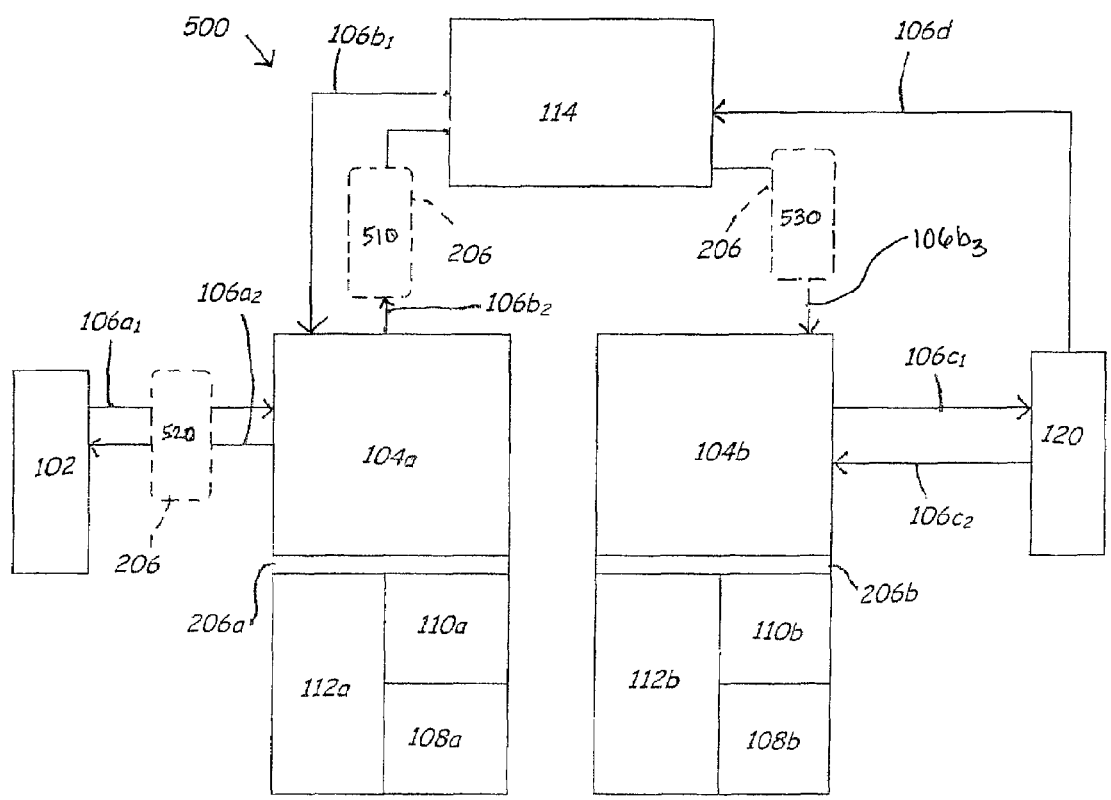
FIG. 5 is a reduced-scale schematic process flow diagram of a chemical distribution system in accordance with the second preferred embodiment of the present invention.

FIG. 5 depicts a second alternative embodiment of the present invention in which a chemical distribution system 500 includes two CDMs—a first CDM 104a and a second CDM 104b. Both CDMs preferably include internal temporary storage tanks 112a and 112b, particle filters 110a and 110b, CDM pumps 108a and 108b, and vessels 206a and 206b. First CDM 104a transfers low purity organic solvent fluid from organic solvent supply source 102 to external temporary storage tank 114 or an internal temporary storage tank 112a. By eliminating fluid flow through a second portion $106b_3$ of piping network 106, the user may create a recirculation path through which the organic solvent fluid contained in either external temporary storage tank 114 or internal temporary storage tank 112a may be continuously recirculated in order to increase its purity. Further, when no organic solvent fluid is available for transport into external temporary storage tank 114, first CDM 104a may withdraw organic solvent fluid from external or internal temporary storage tanks 114 or 112a, respectively, and recirculate the contents back into the respective temporary storage tank. As the contents of external temporary storage tank 114 are recirculated, the organic solvent fluid is further purified by repeated passes through the ion-exchange media. The purified organic solvent fluid may then be transferred from external temporary storage tank 114, through second portion $106b_2$, of piping network 106, into second CDM 104b. After being purified in second CDM 104b, the organic solvent fluid flows through a fluid outlet, shown here as third portion $106c_1$ of piping network 106, into point of use connection 120. Overflow higher purity organic solvent fluid may flow through either third portion $106c_2$ of piping network 106 into second CDM 104b or may flow through return chemical flow pathway piping 106d into external temporary storage tank 114. This recirculation loop facilitates the generation and maintenance of a higher-purity organic solvent fluid by facilitating continual recirculation through vessels 206a and 206b and thus continual purification of the fluid.

Various additional or alternative vessels 206 containing ion-exchange media may be positioned within the fluid flow pathway of chemical distribution system 500, some of which are depicted with phantom lines. For example, a vessel 510 may be positioned between external temporary storage tank 114 and first CDM 104a. Additionally, a vessel 520 may be positioned between organic solvent supply source 102 and first CDM 104a such that the organic solvent fluid may be continuously recycled through the ion-exchange media to increase its purity before being stored in either internal or external temporary storage tanks 112, 114. Additionally, a vessel 530 may be positioned between external temporary storage tank 114 and second CDM 104b. Further, a vessel may be positioned within point of use 120 (not shown).

Figure 6:
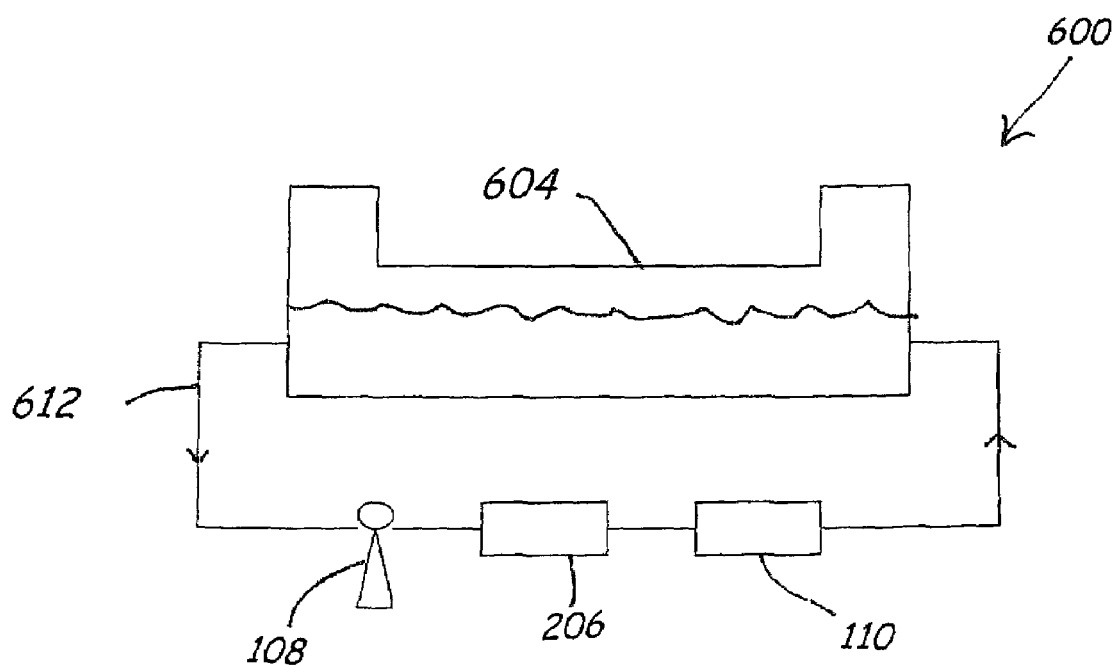
FIG. 6 is a reduced-scale schematic process flow diagram of a chemical distribution system in accordance with the third preferred embodiment of the present invention.

FIG. 6 depicts a third alternative embodiment of the present invention in which stand-alone chemical purification system 600 comprises a semiconductor manufacturing tool having an internal process tank 604, a pump 108, an ion-exchange media-containing vessel 206, a particle filter 110, and a recirculating organic solvent fluid flow pathway 612. The organic solvent fluid in internal process tank 604 may be recirculated through fluid flow pathway 612, causing the organic solvent fluid to pass through vessel 206 and effect removal of the metal and ion impurities in the organic solvent fluid. Thus the organic solvent fluid may be constantly purified such that the placement of articles of manufacture containing impurities into internal process tank 604 does not significantly alter the level of purity of the organic solvent fluid in internal process tank 604.

FIG. 7 depicts a fourth alternative embodiment of the present invention in which stand-alone chemical purification system 700 comprises a semiconductor manufacturing tool including a recirculating fluid flow pathway 714 connecting an internal organic solvent fluid tank 702, a pump 108, an ion-exchange media-containing vessel 206, and a particle filter 110. Pump 108 supplies a motivating force that pumps organic solvent fluid from organic solvent supply source 102 into tank 702, through vessel 206 and filter 110, and then to point of use 720 through fluid flow pathway 716 or through recirculating fluid flow pathway 714 back into tank 702. Stand-alone chemical purification system 700 could be used as the point of use connection 120 of FIG. 1a, 2, 3, 4, 5, or 6. Further, multiple chemical purification systems 700 could be implemented in the chemical distribution system or chemical purification system of the present invention.

FIG. 8 is a stand-alone purification system 800 including a solvent supply source 102 that supplies organic solvent fluid to pump 108, through vessels 206a, 206b, and 206c and filter 110 to fluid outlet 118. Purification system 800 further includes a primary return fluid flow pathway $106d_2$ and a secondary return fluid flow pathway $106d_1$ to form a dual recirculation system through which purified organic solvent fluid may be recirculated. One benefit of having multiple recirculation pathways is that the user may maintain fluid flow. The operation of stand-alone purification system 800 can be carried out in a batch mode or continuously.

Purification system 800 may also include a data processing system 810 that receives and processes system status measurements. The exemplary data processing system shown in FIG. 8 includes a pneumatic solenoid 820 and a computer 830 or data processor that acts to control the fluid flow. System 800 also contains two flow meters 850 that measure flow rate. The output from data processing system 810 allows the user to monitor and control the organic solvent fluid flowing through chemical purification system 800. In an alternative implementation, computer 830 sends the processed information to be accessed via the Internet such that the operator can remotely monitor the system. Data processing system 810 may also be implemented in the chemical distribution systems of the present invention.

One with ordinary skill in the art would understand that the stand-alone purification systems of the present invention may be implemented within a larger chemical distribution system.

The following examples and results serve to illustrate the system for and method of purifying the organic solvent fluids of the present invention.

PROCEDURE FOR EXAMPLES 1-3

Prior to beginning the ion-exchange purification process, all surfaces of equipment to be used were thoroughly washed in a solution containing a mineral acid (e.g., a mixed nitric/hydrochloric solution) and were then rinsed with copious amounts of deionized water having a resistivity value greater than or equal to 18 megaohms. All work is preferably conducted in a clean room or area, and all operators preferably wear clean room garments.

A mixed bed of ion-exchange media containing a ratio of anionic and cationic ion-exchange media was thoroughly rinsed by decantation with deionized water. A second rinse step using isopropyl alcohol was employed to remove the deionized water. Once the water was removed by the isopropyl alcohol, the resin was immersed in successive quantities of the solvent to be purified, allowing displacement of any remaining water or alcohol. The prepared resin was subsequently placed into a one liter borosilicate glass dispense buret having a PTFE stopcock and a PTFE filter. The buret was preferably only partly filled with the ion-exchange media, allowing emplacement of 300 or 400 milliliters of organic solvent fluid. Approximately 10 buret volumes of the organic solvent fluid to be purified were then poured through the ion-exchange media to prepare the resin. The buret was then filled to capacity with the organic solvent fluid, and the stopcock was opened to allow the organic solvent fluid to flow through the buret. The purified organic solvent fluid was collected and poured back into the top of the buret to provide for multiple passes through the ion-exchange media and to simulate the recirculation of solvent in a large-scale purification system. After a desired number of recirculation cycles, samples were collected and transported to an analytical laboratory for analysis.

The purity of the purified organic solvent fluid was adjusted by varying the number of times the organic solvent fluid was passed through the ion-exchange media. Organic solvent fluid purity increased with increased ion-exchange media contact. Thus the operator was able to produce an organic solvent fluid having the desired level of purity.

Example 1

Purification of Ethyl Lactate

The procedure outlined in Example 1 was used to purify a sample of ethyl lactate using a 40:60 mixture of Sybron A-641 and CFP-110 resins, respectively. The ethyl lactate sample was passed through the ion-exchange media four times before the purity of the sample was analyzed. A comparison of the level of metallic contamination of the raw sample and the purified sample is provided in Table I.

TABLE I

A Comparison of the Concentration of Metal Contaminants in a Raw vs. a Purified Sample of Ethyl Lactate

| Metal Contaminants | Detection Limits (ppb) | Raw Sample Concentration (ppb) | Purified Sample Concentration (ppb) |
|---|---|---|---|
| Aluminum | 0.05 | 0.063 | <0.05 |
| Antimony | 0.05 | <0.05 | <0.05 |
| Arsenic | 0.10 | <0.1 | <0.1 |
| Barium | 0.01 | <0.01 | <0.01 |
| Beryllium | 0.05 | <0.05 | <0.05 |
| Bismuth | 0.05 | <0.05 | <0.05 |
| Boron | 0.10 | 6.5 | 4.4 |
| Cadmium | 0.01 | <0.01 | <0.01 |
| Calcium* | 0.10 | 0.20 | 0.85 |
| Chromium | 0.05 | 0.12 | <0.05 |
| Cobalt | 0.01 | <0.01 | <0.01 |
| Copper | 0.05 | 0.066 | 0.38 |
| Gallium | 0.01 | 0.011 | 0.012 |
| Germanium | 0.05 | <0.05 | <0.05 |
| Gold | 0.10 | <0.1 | <0.1 |
| Iron* | 0.10 | 15 | 0.20 |
| Lead | 0.05 | <0.05 | <0.05 |
| Lithium | 0.05 | <0.05 | <0.05 |
| Magnesium | 0.05 | <0.05 | <0.05 |
| Manganese | 0.05 | <0.05 | <0.05 |
| Molybdenum | 0.05 | <0.05 | <0.05 |
| Nickel | 0.05 | 0.098 | <0.05 |
| Niobium | 0.05 | <0.05 | <0.05 |
| Potassium* | 0.10 | 13 | 2.5 |
| Silver | 0.05 | <0.05 | <0.05 |
| Strontium | 0.01 | <0.01 | <0.01 |
| Tantalum | 0.05 | <0.05 | <0.05 |
| Thallium | 0.01 | <0.01 | <0.01 |
| Tin | 0.05 | <0.05 | <0.05 |
| Titanium | 0.05 | 0.12 | 0.067 |
| Vanadium | 0.05 | <0.05 | <0.05 |
| Zinc | 0.05 | 1.2 | 0.28 |
| Zirconium | 0.01 | 0.026 | <0.01 |

*Ca, Fe, and K are analyzed by GFAA or cold plasma ICP-MS. All other elements were analyzed by ICP-MS.

Table I shows that the concentration of metallic contamination of the ethyl lactate sample significantly decreased as a result of the above-identified purification procedure. Specifically, the concentration of many of the metallic contaminants was reduced to less than 1 ppb, a level heretofore unachievable.

Example II

Purification of Acetonitrile

The above-described procedure was used to purify a sample of acetonitrile using a 8:5 mixture of Sybron A-641 and CFP-110 resins respectively. The acetonitrile sample was passed through the ion-exchange media six times before the purity of the sample was analyzed. A comparison of the level of metallic contamination of the raw sample and the purified sample is provided in Table II.

TABLE II

An Analysis of the Concentration of Metallic Contaminants in a Purified Sample of Acetonitrile

| | Detection Limits (ppb) | Concentration of Raw Sample (ppb) | Concentration of Purified Sample (ppb) |
|---|---|---|---|
| Aluminum | 0.05 | <0.05 | <0.05 |
| Antimony | 0.05 | <0.05 | <0.05 |
| Arsenic | 0.10 | <0.1 | <0.1 |
| Barium | 0.01 | <0.01 | <0.01 |
| Beryllium | 0.05 | <0.05 | <0.05 |
| Bismuth | 0.05 | <0.05 | <0.05 |
| Boron | 0.10 | 0.41 | 0.61 |
| Cadmium | 0.01 | <0.01 | <0.01 |
| Calcium* | 0.10 | <0.1 | <0.1 |
| Chromium | 0.05 | <0.05 | <0.05 |
| Cobalt | 0.01 | <0.01 | <0.01 |
| Copper | 0.05 | <0.05 | <0.05 |
| Gallium | 0.01 | <0.01 | <0.01 |
| Germanium | 0.05 | <0.05 | <0.05 |
| Gold | 0.10 | <0.1 | <0.1 |
| Iron* | 0.10 | <0.1 | <0.1 |
| Lead | 0.05 | <0.05 | <0.05 |
| Lithium | 0.05 | <0.05 | <0.05 |
| Magnesium | 0.05 | <0.05 | <0.05 |
| Manganese | 0.05 | <0.05 | <0.05 |
| Molybdenum | 0.05 | <0.05 | <0.05 |

TABLE II-continued

An Analysis of the Concentration of Metallic Contaminants in a Purified Sample of Acetonitrile

|  | Detection Limits (ppb) | Concentration of Raw Sample (ppb) | Concentration of Purified Sample (ppb) |
|---|---|---|---|
| Nickel | 0.05 | <0.05 | <0.05 |
| Niobium | 0.05 | <0.05 | <0.05 |
| Potassium* | 0.10 | <0.1 | <0.1 |
| Silver | 0.05 | <0.05 | <0.05 |
| Sodium | 0.10 | 5.6 | <0.1 |
| Strontium | 0.01 | <0.01 | <0.01 |
| Tantalum | 0.05 | <0.05 | <0.05 |
| Thallium | 0.01 | <0.01 | <0.01 |
| Tin | 0.05 | <0.05 | <0.05 |
| Titanium | 0.05 | <0.05 | 0.29 |
| Vanadium | 0.05 | <0.05 | <0.05 |
| Zinc | 0.05 | <0.05 | 0.078 |
| Zirconium | 0.01 | <0.01 | <0.01 |

*Ca, Fe, and K are analyzed by GFAA or cold plasma ICP-MS. All other elements were analyzed by ICP-MS.

Table II shows that the concentration of sodium contamination of the acetonitrile sample decreased to less than 0.1 ppb as a result of the above-identified purification procedure.

Example III

Purification of Ethylene Glycol

The above-described procedure was used to purify a sample of ethylene glycol using a 4:3 mixture of Sybron A-641 and CFP-110 resins. The ethylene glycol sample was passed through the ion-exchange media once before the purity of the sample was analyzed. A comparison of the level of metallic contamination of the raw sample and the purified sample is provided in Table III.

TABLE III

An Analysis of the Concentration of Metallic Contaminants in a Purified Sample of Ethylene Glycol

|  | Detection Limits (ppb) | Concentration of Raw Sample (ppb) | Concentration of Purified Sample (ppb) |
|---|---|---|---|
| Aluminum | 0.05 | 2.9 | 0.79 |
| Antimony | 0.05 | 0.090 | <0.05 |
| Arsenic | 0.10 | <0.1 | 0.028 |
| Barium | 0.01 | 2.3 | <0.01 |
| Beryllium | 0.05 | <0.05 | <0.05 |
| Bismuth | 0.05 | <0.05 | <0.05 |
| Boron | 0.10 | 0.74 | 0.52 |
| Cadmium | 0.01 | 0.23 | 0.016 |
| Calcium* | 0.10 | 130 | 0.60 |
| Chromium | 0.05 | 0.69 | <0.05 |
| Cobalt | 0.01 | 0.053 | <0.01 |
| Copper | 0.05 | 0.83 | 0.44 |
| Gallium | 0.01 | 0.94 | <0.01 |
| Germanium | 0.05 | <0.05 | <0.05 |
| Gold | 0.10 | <0.1 | <0.1 |
| Iron* | 0.10 | 190 | 13 |
| Lead | 0.05 | 0.71 | 0.17 |
| Lithium | 0.05 | <0.05 | <0.05 |
| Magnesium | 0.05 | 13 | <0.05 |
| Manganese | 0.05 | 0.95 | 0.063 |
| Molybdenum | 0.05 | <0.066 | <0.05 |
| Nickel | 0.05 | 0.57 | 0.065 |
| Niobium | 0.05 | <0.05 | <0.05 |
| Potassium* | 0.10 | 42 | 1.5 |
| Silver | 0.05 | <0.05 | <0.05 |
| Sodium | 0.10 | 1900 | 100 |
| Strontium | 0.01 | 0.70 | <0.01 |
| Tantalum | 0.05 | <0.05 | <0.05 |
| Thallium | 0.01 | <0.01 | <0.01 |
| Tin | 0.05 | 0.086 | <0.05 |
| Titanium | 0.05 | 0.09 | <0.05 |
| Vanadium | 0.05 | <0.05 | <0.05 |
| Zinc | 0.05 | 130 | 7.2 |
| Zirconium | 0.01 | 0.021 | <0.01 |

*Ca, Fe, and K were analyzed by GFAA or cold plasma ICP-MS. All other elements were analyzed by ICP-MS.

Table III shows that the concentration of metallic contamination of the ethylene glycol sample significantly decreased as a result of the above-identified purification procedure. Specifically, the concentration of many of the metallic contaminants was reduced to less than 1 ppb.

The chemical distribution system of the present invention confers various advantages including: (1) the purity level of chemical produced can be determined within the system and automatic compensation for variation in fluid flow rate can be programmed into a fluid flow controller; (2) the rate of chemical production can be changed to meet quality or quantity requirements; (3) the system operator may significantly lower chemical costs by placing the purification system at the end user facility, allowing the production of higher purity solvents from lower cost industrial-grade solvents.

It will be obvious to those having skill in the art that many changes may be made to the details of the above-described embodiments of this invention without departing from the underlying principles thereof. Accordingly, the scope of the invention is not limited by the specific examples provided herein. For example, the present invention is not limited to use in chemical distribution systems used in the manufacture of integrated circuits; other exemplary applications include flat panel display manufacturing and biotechnology systems as well as stand-alone purification systems. Also, the present invention can be adapted to chemical distribution systems used in the manufacture of other technologies in which integrated circuit manufacturing methods have been adopted, such as in manufacturing thin-film magnetic heads and MEMS devices. Further, the present invention is not limited to a single chemical distribution system. A chemical distribution system fluid flow pathway may include additional flow pathways, wherein purified organic solvent fluid is transported through the piping network to a fluid outlet. The scope of the present invention should, therefore, be determined only by the following claims.

The invention claimed is:

1. A system for purifying an organic solvent fluid and supplying the purified organic solvent fluid to a fluid outlet, the system comprising:
   a fluid flow pathway including an organic solvent fluid supply source that supplies organic solvent fluid to a vessel containing an ion-exchange media having electrically charged species that ionically interact with metallic and ionic impurities in the organic solvent fluid such that these impurities are removed from the organic solvent fluid as the fluid passes through the ion-exchange media, the fluid flow pathway further including a return chemical flow pathway that facilitates recirculation of the purified organic solvent fluid through at least a portion of the fluid flow pathway, thereby enabling passage of the organic solvent fluid through the ion-exchange media multiple times and thereby facilitating incremental purification of the organic solvent fluid until a desired level of purity is achieved.

2. The system of claim 1, wherein the return chemical flow pathway causes a subsequent passage of the organic solvent fluid through the ion-exchange media to provide the organic solvent fluid with a greater purity than the organic solvent fluid had after a previous passage of the organic solvent fluid through the ion-exchange media.

3. The system of claim 1, further including a chemical distribution module that supplies a motivating force to pump the organic solvent fluid through the fluid flow pathway.

4. The system of claim 3, wherein the return chemical flow pathway causes a subsequent passage of the organic solvent fluid through the ion-exchange media to provide the organic solvent fluid with a greater purity than the organic solvent fluid had after a previous passage of the organic solvent fluid through the ion-exchange media.

5. The system of claim 3, further including multiple chemical distribution modules.

6. The system of claim 5, wherein the return chemical flow pathway causes a subsequent passage of the organic solvent fluid through the ion-exchange media to provide the organic solvent fluid with a greater purity than the organic solvent fluid had after a previous passage of the organic solvent fluid through the ion-exchange media.

7. The system of claim 3, in which the vessel is positioned adjacent to the chemical distribution module.

8. The system of claim 7, wherein the return chemical flow pathway causes a subsequent passage of the organic solvent fluid through the ion-exchange media to provide the organic solvent fluid with a greater purity than the organic solvent fluid had after a previous passage of the organic solvent fluid through the ion-exchange media.

9. The system of claim 3, further comprising at least one pump and in which the rate of flow of the organic solvent fluid passing through the fluid flow pathway is substantially constant such that the incidence of impurities being dislodged from the chemical distribution module is minimized.

10. The system of claim 9, wherein the return chemical flow pathway causes a subsequent passage of the organic solvent fluid through the ion-exchange media to provide the organic solvent fluid with a greater purity than the organic solvent fluid had after a previous passage of the organic solvent fluid through the ion-exchange media.

11. The system of claim 3, further including a storage tank positioned adjacent to the chemical distribution module, the storage tank forming a secondary supply source that supplies organic solvent to the fluid flow pathway.

12. The system of claim 11, wherein the return chemical flow pathway causes a subsequent passage of the organic solvent fluid through the ion-exchange media to provide the organic solvent fluid with a greater purity than the organic solvent fluid had after a previous passage of the organic solvent fluid through the ion-exchange media.

13. The system of claim 1, in which the vessel is positioned adjacent to the fluid outlet.

14. The system of claim 13, wherein the return chemical flow pathway causes a subsequent passage of the organic solvent fluid through the ion-exchange media to provide the organic solvent fluid with a greater purity than the organic solvent fluid had after a previous passage of the organic solvent fluid through the ion-exchange media.

15. The system of claim 1, in which the vessel is positioned at a location in the fluid flow pathway that is between the solvent supply source and the fluid outlet.

16. The system of claim 15, wherein the return chemical flow pathway causes a subsequent passage of the organic solvent fluid through the ion-exchange media to provide the organic solvent fluid with a greater purity than the organic solvent fluid had after a previous passage of the organic solvent fluid through the ion-exchange media.

17. The system of claim 1 having multiple vessels containing ion-exchange media.

18. The system of claim 17, wherein the return chemical flow pathway causes a subsequent passage of the organic solvent fluid through the ion-exchange media to provide the organic solvent fluid with a greater purity than the organic solvent fluid had after a previous passage of the organic solvent fluid through the ion-exchange media.

19. The system of claim 17, in which the multiple vessels are positioned in parallel alignment.

20. The system of claim 19, wherein the return chemical flow pathway causes a subsequent passage of the organic solvent fluid through the ion-exchange media to provide the organic solvent fluid with a greater purity than the organic solvent fluid had after a previous passage of the organic solvent fluid through the ion-exchange media.

21. The system of claim 17, in which the multiple vessels including ion-exchange media are positioned in series alignment.

22. The system of claim 21, wherein the return chemical flow pathway causes a subsequent passage of the organic solvent fluid through the ion-exchange media to provide the organic solvent fluid with a greater purity than the organic solvent fluid had after a previous passage of the organic solvent fluid through the ion-exchange media.

23. The system of claim 1, in which the system includes multiple return chemical flow pathways.

24. The system of claim 23, wherein the return chemical flow pathway causes a subsequent passage of the organic solvent fluid through the ion-exchange media to provide the organic solvent fluid with a greater purity than the organic solvent fluid had after a previous passage of the organic solvent fluid through the ion-exchange media.

25. The system of claim 1, in which the ion-exchange media comprises a macroporous strong acid type.

26. The system of claim 25, wherein the return chemical flow pathway causes a subsequent passage of the organic solvent fluid through the ion-exchange media to provide the organic solvent fluid with a greater purity than the organic solvent fluid had after a previous passage of the organic solvent fluid through the ion-exchange media.

27. The system of claim 1, in which the ion-exchange media comprises a macroporous strong base type.

28. The system of claim 27, wherein the return chemical flow pathway causes a subsequent passage of the organic solvent fluid through the ion-exchange media to provide the organic solvent fluid with a greater purity than the organic solvent fluid had after a previous passage of the organic solvent fluid through the ion-exchange media.

29. The system of claim 1, in which the ion-exchange media comprises a mixture of macroporous strong acid type media and macroporous strong base type media.

30. The system of claim 29, wherein the return chemical flow pathway causes a subsequent passage of the organic solvent fluid through the ion-exchange media to provide the organic solvent fluid with a greater purity than the organic solvent fluid had after a previous passage of the organic solvent fluid through the ion-exchange media.

31. The system of claim 1, in which the vessel includes multiple types of ion-exchange media.

32. The system of claim 31, wherein the return chemical flow pathway causes a subsequent passage of the organic solvent fluid through the ion-exchange media to provide the organic solvent fluid with a greater purity than the organic solvent fluid had after a previous passage of the organic solvent fluid through the ion-exchange media.

33. The system of claim 1, in which the organic solvent fluid includes an amphiprotic solvent.

34. The system of claim 33, wherein the return chemical flow pathway causes a subsequent passage of the organic solvent fluid through the ion-exchange media to provide the organic solvent fluid with a greater purity than the organic solvent fluid had after a previous passage of the organic solvent fluid through the ion-exchange media.

35. The system of claim 33, in which the amphiprotic solvent is selected from a group consisting essentially of isopropanol, ethyl lactate, n-butyl acetate, ethylene glycol, cyclopentanone, and mixtures thereof.

36. The system of claim 35, wherein the return chemical flow pathway causes a subsequent passage of the organic solvent fluid through the ion-exchange media to provide the organic solvent fluid with a greater purity than the organic solvent fluid had after a previous passage of the organic solvent fluid through the ion-exchange media.

37. The system of claim 1, in which the organic solvent fluid includes a polar aprotic solvent.

38. The system of claim 37, wherein the return chemical flow pathway causes a subsequent passage of the organic solvent fluid through the ion-exchange media to provide the organic solvent fluid with a greater purity than the organic solvent fluid had after a previous passage of the organic solvent fluid through the ion-exchange media.

39. The system of claim 17, in which the polar aprotic solvent is selected from a group consisting essentially of acetonitrile, acetone, dimethylformamide, and mixtures thereof.

40. The system of claim 39, wherein the return chemical flow pathway causes a subsequent passage of the organic solvent fluid through the ion-exchange media to provide the organic solvent fluid with a greater purity than the organic solvent fluid had after a previous passage of the organic solvent fluid through the ion-exchange media.

41. The system of claim 1, in which the organic solvent fluid includes an aromatic compound.

42. The system of claim 41, wherein the return chemical flow pathway causes a subsequent passage of the organic solvent fluid through the ion-exchange media to provide the organic solvent fluid with a greater purity than the organic solvent fluid had after a previous passage of the organic solvent fluid through the ion-exchange media.

43. The system of claim 41, in which the aromatic compound is selected from a group consisting essentially of benzocyclobutene, polyaryl ethers, and mixtures thereof.

44. The system of claim 43, wherein the return chemical flow pathway causes a subsequent passage of the organic solvent fluid through the ion-exchange media to provide the organic solvent fluid with a greater purity than the organic solvent fluid had after a previous passage of the organic solvent fluid through the ion-exchange media.

45. The system of claim 1, in which the organic solvent fluid includes a dielectric precursor fluid.

46. The system of claim 45, wherein the return chemical flow pathway causes a subsequent passage of the organic solvent fluid through the ion-exchange media to provide the organic solvent fluid with a greater purity than the organic solvent fluid had after a previous passage of the organic solvent fluid through the ion-exchange media.

47. The system of claim 45, in which the dielectric precursor fluid is selected from a group consisting essentially of tetraethylorthosilicate, porous or non-porous organic silicate esters, fluorinated organic silicate esters, perfluorocyclobutenes, hydrogen silsequioxanes, methyl silsequioxane, and mixtures thereof.

48. The system of claim 47, wherein the return chemical flow pathway causes a subsequent passage of the organic solvent fluid through the ion-exchange media to provide the organic solvent fluid with a greater purity than the organic solvent fluid had after a previous passage of the organic solvent fluid through the ion-exchange media.

49. The system of claim 1, in which the organic solvent fluid includes an edge-bead removal chemical.

50. The system of claim 49, wherein the return chemical flow pathway causes a subsequent passage of the organic solvent fluid through the ion-exchange media to provide the organic solvent fluid with a greater purity than the organic solvent fluid had after a previous passage of the organic solvent fluid through the ion-exchange media.

51. The system of claim 49, in which the edge-bead removal chemical includes a lactate solvent.

52. The system of claim 51, wherein the return chemical flow pathway causes a subsequent passage of the organic solvent fluid through the ion-exchange media to provide the organic solvent fluid with a greater purity than the organic solvent fluid had after a previous passage of the organic solvent fluid through the ion-exchange media.

53. The system of claim 1, in which the impurity is selected from a group consisting essentially of aluminum, antimony, arsenic, barium, beryllium, bismuth, boron, cadmium, calcium, chloride, chromium, cobalt, copper, gallium germanium, gold, iron, lead, lithium, magnesium, manganese, molybdenum, nickel, niobium, potassium, silver, sodium, strontium, tantalum, thallium, tin, titanium vanadium, zinc, and zirconium.

54. The system of claim 53, wherein the return chemical flow pathway causes a subsequent passage of the organic solvent fluid through the ion-exchange media to provide the organic solvent fluid with a greater purity than the organic solvent fluid had after a previous passage of the organic solvent fluid through the ion-exchange media.

* * * * *